United States Patent [19]

Engman

[11] Patent Number: 4,531,391
[45] Date of Patent: Jul. 30, 1985

[54] ADAPTIVE METHOD AND APPARATUS FOR CORRECTING DEVIATIONS IN THE SHAPE OF OBJECTS

[75] Inventor: Guy R. Engman, Ärla, Sweden

[73] Assignee: AB Thorns Mekaniska Verkstad, Spanga, Sweden

[21] Appl. No.: 361,142

[22] Filed: Mar. 24, 1982

[30] Foreign Application Priority Data

Apr. 1, 1981 [SE] Sweden ............................ 81020893

[51] Int. Cl.³ .............................................. B21B 37/00
[52] U.S. Cl. .......................................... 72/10; 72/416; 72/702
[58] Field of Search ................... 72/7, 702, 8, 9, 10, 72/11, 12, 416; 364/148

[56] References Cited

U.S. PATENT DOCUMENTS

| 3,650,143 | 3/1972 | Ruget | 29/6 |
| 3,713,312 | 1/1973 | Galdabini | 72/702 |
| 3,754,431 | 8/1973 | Ramdohr | 72/416 |
| 3,787,667 | 1/1974 | King et al. | 72/8 |
| 3,943,746 | 3/1976 | Eitel et al. | 72/384 |
| 4,291,569 | 9/1981 | Breiding | 72/7 |

FOREIGN PATENT DOCUMENTS

| 56-160815 | 12/1981 | Japan | 72/7 |
| 715172 | 2/1980 | U.S.S.R. | 72/21 |

Primary Examiner—Lowell A. Larson
Assistant Examiner—Jorji M. Griffin
Attorney, Agent, or Firm—James & Franklin

[57] ABSTRACT

Deviations from desired shape of plasticly deformable objects are corrected within narrow tolerances by a method wherein the real shape of the object is sensed, whereupon the deviation from the desired shape is determined and a correction length corresponding to the deviation is defined, after which the object in a straightening operation is subjected to a shape correction corresponding to the correction length. At least one measurement transmitter (4) is disposed to sense the real shape of the object (2) and deliver a corresponding output signal which is fed to a unit (6,8,9) for comparison with information about the desired shape of the object stored in the unit for determining the deviation, the unit delivering an output signal defining a correction length corresponding to the deviation, the output signal controlling a straightening device (12,14,16,18,20,22,24) to carry out a correction of the shape of the object corresponding to the correction length. The method and the apparatus are adaptive as the shape of the object (2) is sensed after the shape correction and the relationship between correction length and deviation in the shape is modified in response to a possibly remaining deviation in the shape.

10 Claims, 8 Drawing Figures

ADAPTIVE METHOD AND APPARATUS FOR CORRECTING DEVIATIONS IN THE SHAPE OF OBJECTS

The present invention relates to an adaptive method for correcting deviations in the desired shape of plastically deformable objects, said method comprising the steps of sensing the real shape of the objects, then determining the deviation from desired shape and defining a correction length corresponding to said deviation, followed by subjecting the object in a straightening operation to a shape correction corresponding to the correction length, and to an apparatus for carrying out the method.

Before cutting machining, or as an intermediate operation, most products of, for instance, steel are subject to a thermal treatment. Despite refined methods for heat treatment, form defects arise due to remaining strain, e.g. bending of shafts and ovalities of rings, which must be corrected before the product is finished. The most usual method in this connection is to increase the working allowance of the product and correct the form defects by cutting machining methods, e.g. grinding. Another usual method of correction of this kind consists in the correction or straightening being performed by hand by first measuring the form defect and then straightening the product by bending or by impact. A third method consists in correction or straightening of the product or article in a straightening press. This method is primarily intended for products which due to their shape, dimension or rigidity cannot be straightened or corrected by hand.

The method mentioned above for straightening or correcting by cutting machining has the disadvantage of being very expensive, since increased working allowances require longer machining times in the machines used. It is particularly expensive to correct form defects by grinding. Neither can the method be used, or the method implies an expensive additional operation, in case of the heat treatment being performed after the finishing. Another problem with this method of correction is that the chucking before the machining can result in a plastic correction of the form defect during the operation itself without changing the internal strength which results in the form defect remaining after the cutting operation.

The disadvantages with the hand operated correction straightening are that this method is very inaccurate and therefore cannot be used when close tolerances are required. Neither can this method be used for products having large dimensions or high rigidity. Another disadvantage with the method is that new strengths can arise in the material due to the correction of form defects by impacts, which then often have the result that the form defect will arise again as time goes on. The method also necessitates great experience and high professional proficiency of the persons performing the straightening or correction. However, since this method is imparied by ergonomic problems as well as environmental problems, the industry has great difficulty in recruiting staff willing to learn manual correction straightening.

Straightening presses are used only for larger products of hard material. This correction method, however, has become more and more unacceptable due to its inaccuracy and its disadvantages from the point of view of labor welfare. The security regulations and the difficulties of correction in straightening presses are such that the method has become very time-consuming and therefore expensive.

In the two last mentioned methods the correction of the form defect thus is performed by deforming the body or the object to such an extent and in such a direction that the desired ideal shape shall be re-gained. In manual correction as well as correction in a straightening press the body is deformed by a force and over a certain length which are related to the size of the form defect. In manual straightening, however, neither force nor length can be controlled and the result is entirely dependent on the experience and the proficiency of the operator. In straightening presses the force can comparatively well be controlled whereas the length for the correction process which is a function of the size of the form defect only can be adjusted manually and without greater accuracy. As in manual correction the choice of the dimension of the length is dependent on the proficiency of the press operator.

A purpose of the present invention is to propose a new method and provide a new apparatus for correcting deviations in the shape of plastically deformable objects, said method and apparatus avoiding the disadvantages of the above described previously known methods and making fast automatic correction with high accuracy of deviations in the shape possible.

Another purpose of the invention is to propose a method and provide an apparatus for automatically taking into consideration gradually changes during a manufacturing series in properties of the object the shape of which is to be corrected. Such changes can, for example be changes in the hardness of the material as a result of changes in the hardening process or changes in the wall thickness of the object as the result of wearing of machining tools.

These purposes are obtained by a method of the kind mentioned in the introduction and which is characterized in that the size of the correction length is given from a predetermined relationship between correction length and deviation and in that the shape of said object is sensed again after the straightening operation and any possibly remaining deviation from the desired shape is established, whereupon said relation between correction length and deviation is changed as a function of said remaining deviation. The purpose are obtained by an apparatus for correcting deviation from desired shape of plastically deformable objects, said apparatus comprising at least one measuring transmitter for sensing the real shape of an object and delivering a corresponding output signal which is sent to a unit for determining the deviation from desired shape, said unit delivering an output signal defining a correction length corresponding to said deviation, said output signal controlling a straightening device for carrying out a correction of the shape of the object determined by the correction length. The apparatus is characterized in that said unit for determining the deviation comprises a data processing unit in which information about desired shape of the object is stored, and in that the relationship between deviation in the shape and the correction length is stored in a memory connected to said data processing unit, said data processing unit being disposed to compare the sensed shape with the desired shape of the object in response to the signal received from the measuring transmitter for determining the deviation in the shape and from said relationship determine the size of the necessary correction length for the sensed deviation in the shape, and in that said data processing unit is arranged to hydraulically or mechanically control driven staightening members of the straightening device to perform a correcting formation of the object determined by the correction length, said measuring transmitter being disposed to sense a possibly remaining deviation in the shape of the object after this straightening operation and deliver a second output signal corresponding to the remaining deviation in the shape to said data processing unit, said second output signal controlling said data processing unit to amend the relationship stored in said memory as a function of said remaining deviation.

Figure 1:
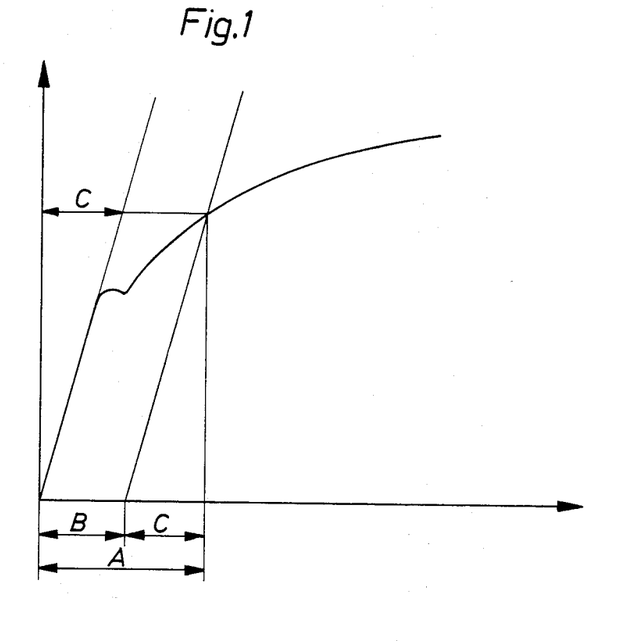
FIG. 1 shows the relationship between correction length and stress for tensile test in a plastically deformable material, cf. the above, FIG. 2 the principal appearance of the correction graphs of the invention, i.e. the relationship between shape deviation and required correction length, FIG. 3 an outline diagram of an embodiment of the apparatus according to the invention, FIG. 4 a flow chart illustrating the function of the apparatus in FIG. 3, FIG. 5 an example of sensing the shape of a shaft, FIG. 6 an example of straightening the shaft.

The invention is based on the principle that the object, the shape of which is to be corrected, is subjected to an adjustment or correction motion over an accurately determined correction length adapted to the size of the form defect. The correction motion is produced by a constant force sufficiently large for the deformation of the object. The correction length shall be so long that the stress is reached in the object for which a desired remaining change in the shape is obtained, cf. FIG. 1 where a typical relationship between correction length and stress is shown for a plastically deformable material. As a principle example, with a total correction length (the way of the straightening member) A in the figure an elastic deformation (back resilience) C and a plastic deformation, i.e. a permanent change in the shape B, are then obtained.

Thus, according to the present invention an accurate determination of the size of the form defect or deviation is first performed. Straightening or correction length are calculated for different form defects and stored so that the correction length which corresponds to the actual form defect can be determined. In a straightening operation the object is then subjected to a correction of the shape corresponding to said correction length by bringing straightening members to move a distance corresponding to said correction length while affecting the object the shape of which is to be corrected.

After the straightening operation the shape of the object is again measured and possible remaining form defects are determined, whereupon the above mentioned relationship between correction length and size of the deviation in the shape is modified in response to said measured remaining form defect for the purpose of improving the straightening of the shape for the next object. In this modification of the relationship correction length-deviation in the shape, it is taken into consideration whether there has been a so-called over or under straightening, i.e. whether the correction of the shape has been too large or too small. Thus the invention suggests an adaptive method and an adaptive apparatus for correction of the shape.

The time for a correction process according to the invention is estimated to be from 15 to 35 seconds, whereas the average time for manual correction or correction in a straightening press never is less than 2 minutes (according to information from Volvo Komponenter AB, Köping, Sweden). Further, with the invention the correction can be performed completely independent of the operator. The apparatus according to the invention is also very much cheaper to build than the straightening presses which are presently used.

According to a preferred embodiment of the invention the correcting modification of the relationship between correction length and deviation in the shape is performed by multiplying the correction length by a factor which is reciprocally proportional to the difference in the deviation in the shape before and after the straightening operation.

According to another advantageous embodiment the average value of the correction length is continously formed during a number, preferably between 10 and 50, of the previous straightening operations, which average value is used in the straightening operation in question.

If the properties of the object are gradually changed, a continuous adaptive measurement control is obtained in this way. Further, single defective examples of the object having very large deviations in the shape is in this way prevented from disturbing the straightening of the following objects.

According to an advantageous further development of the method according to the invention the shape of the object is sensed once again after the first straightening operation and, if necessary, the correction process is repeated. The value of the correction length for the successive straightening operations is then obtained from different relationships between correction length and deviation in the form. After the last operation of shape correction the shape of the object is preferably sensed to decide if the object can be accepted or has to be rejected.

Such a multi-step method can also with advantage be used for accurately determining the relationship between correction length and shape deviation.

According to a preferred embodiment of the apparatus according to the invention, the unit in which the deviation is determined and a corresponding correction length is defined is formed of a data processing unit having a memory for storing the relationship between correction length and deviation in the shape.

The apparatus is further characterized in that the measuring transmitter is disposed to sense possible remaining deviations in the shape of the object after the straightening operation and deliver a corresponding second output signal for modifying the relationship between correction length and shape deviation as a function of said remaining shape deviation.

According to another further developement of the apparatus according to the invention the straightening device comprises straightening members which for the correcting forming of the object are advanced with a constant force over a distance corresponding to the correction length.

According to still another advantageous embodiment of the apparatus according to the invention for rotational symmetric objects, members are provided to rotate the article when the measurement transmitter is sensing the shape and the above mentioned unit is arranged to determine the largest deviation from desired shape. Members are further disposed to then turning the object to a position in relation to the straightening members, so that these engage the object in such a way that at first hand the maximum deviation in the shape is corrected.

Embodiments of the invention chosen as examples will now be described in further detail hereinafter with refererence to the annexed drawings on which

Figure 3:
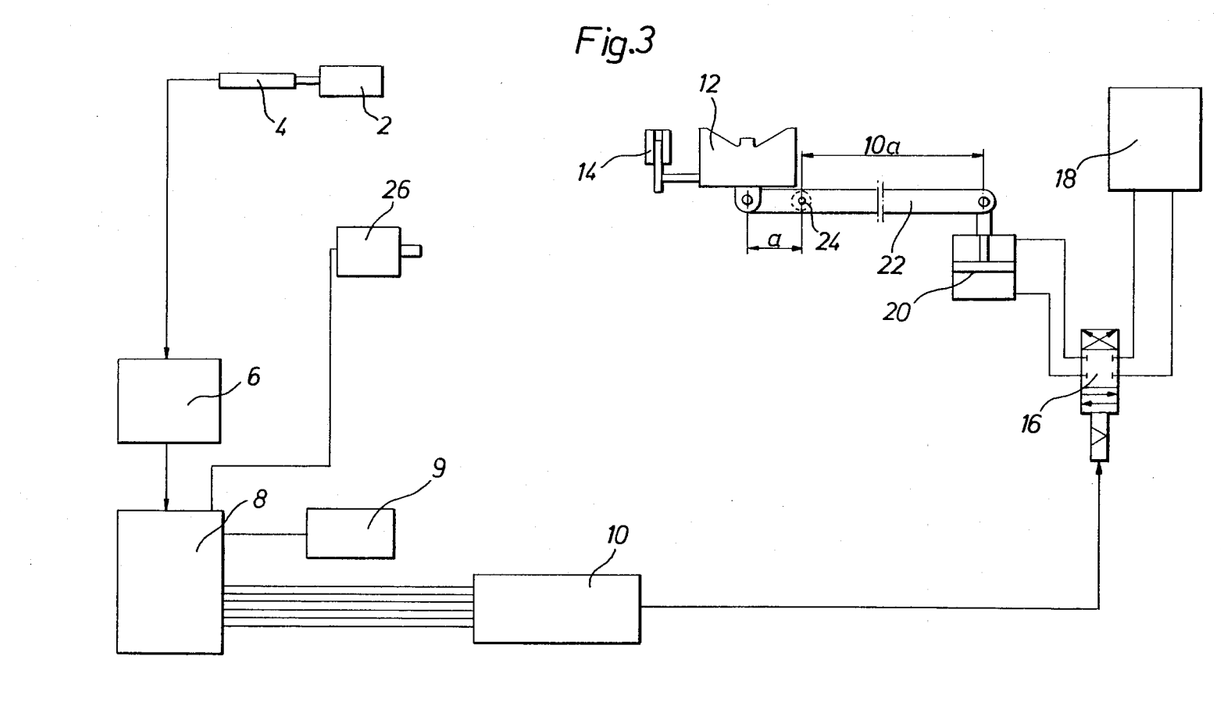

FIG. 3 shows an outline diagram of an embodiment of the apparatus according to the invention. In the Figure an object 2 is schematically shown, the shape of which is sensed by a measurement transmitter 4 which preferably is of an inductive type. The measurement transmitter 4 delivers an analogue signal, representing the actual shape of the object 2. This output signal from the measurement transmitter is fed to an electronic measuring unit 6. The object 2 is formed of a rotational symmetric body which is rotated during the sensing so that the measurement transmitter 4 will move around the object, and in the measurement unit 6 the maximum deviation from nominal shape of the object 2 is then determined from the signal from the measurement transmitter 4 and this maximum deviation is stored.

From the measurement unit 6 an output signal is thus obtained representing the maximum deviation from nominal shape of the object 2, which signal is fed to a microcomputer 8. As microcomputer any suitable commercially available microcomputer can be used, e.g. ABC 80 manufactured by Luxor.

Figure 2:
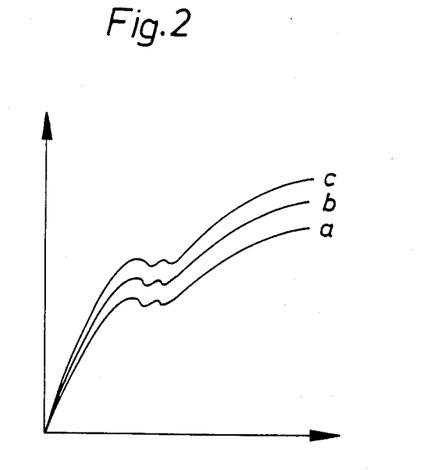

In a memory 9 connected to the microcomputer 8 straightening or correction curves of the kind shown in FIG. 2 are stored. The exact course of these curves is, preferably by experiments, determined for each object to be straightened, said apparatus according to the invention may well be used for this determination as explained more in detail below. By the adaptive construction of the apparatus a continuous correction of the curves is made when correcting the shape of objects in long series as also will be more in detail explained below. The shape of the curves depends among others on the shape and size of the product or object as well as the hardness and composition of the material.

From the corresponding stored shape correction curve the microcomputer 8 computes a correction length corresponding to the measured deviation in the shape which is transmitted to a position servo unit 10 which is connected to a hydraulic system for adjusting hydraulically driven straightening members in accordance with the determined correction length. In the servo unit 10 the correction length obtained from the microcomputer 8 is then compared with the position of the straightening block 12 and for that purpose the straightening block 12 is provided with a position indicator 14 for indicating to the position servo unit the real position of the block 12.

The servo unit 10 is connected to a servo valve 16 which is connected in a hydraulic circuit between a hydraulic pump 18 and a hydraulic cylinder 20 which is controlling the motion of the straightening block 12.

The hydraulic pump 18 supplies hydraulic fluid, preferably oil, under high pressure, typically 70 to 120 bars, and is connected to the hydraulic cylinder 20 through the servo valve 16. The servo valve 16 is preferably of the type in which the valve slide variably can take any position, i.e. the size of the openings of the valve can be continuously varied. In this way the velocity of the motion of the hydraulic cylinder can be varied between 0 and maximum velocity.

As servo unit 10 an automatic control system of the type marketed by Bofors Elektronik AB by the denomination "Position servo typ 1 och komparatormodul H-2-KK" can be used. The servo unit can then be digitally controlled from the micro computer and in addition to information about the size of the correction length also other information, such as desired resolution in the motion of the straightening block, can be fed to the servo unit. The servo unit 10 comprises a D/A-converter so that the servo valve 16 is controlled by an analogue output signal from the servo unit 10.

The motion of the hydraulic cylinder 20 is transmitted by lever means 22 to the straightening block 12. The lever 22 is rotatable around an axis 24 which is so arranged in the example that a transmission ratio of 1:10 is obtained between the motion of the hydraulic cylinder 20 and that of the straightening block 12.

After the staightening operation the measuring transmitter 4 is again sensing the shape of the object 2 and possible remaining deviation in the shape is determined. A corresponding signal is delivered by the measuring transmitter 4 via the measuring unit 6 to the micro computer 8 which in accordance with this measured remaining deviation in the shape modifies the shape correction curve stored in the memory 9 so that the correction will be improved in the next straightening. In that connection it is taken into consideration if there has been so-called over- or understraightening, i.e. if the correction length has been too long or too short. In this way an adaptive control of the straightening block 12 is obtained. The modification of the correction length can be done e.g. simply by multiplication by a factor which is reciprocally proportional to the difference between the deviation in the shape before and after the shape correcting operation. The shape of the object, thickness of material, cross section area and so on are then of importance for the value of said factor. The factor can moreover in an adaptive way be determined by means of the apparatus according to the invention.

Figure 4:
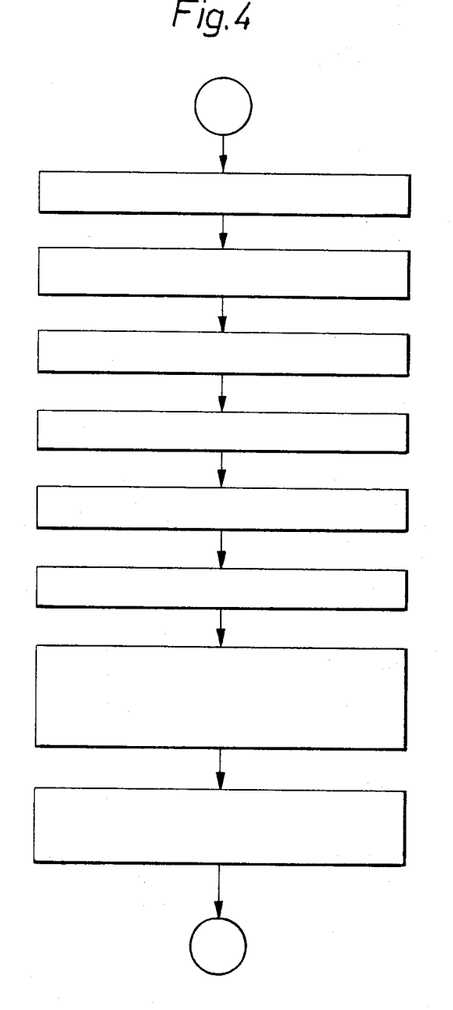

FIG. 4 shows by a flow chart how the apparatus shown in FIG. 3 works.

The apparatus according to the invention can advantageously also be modified so that the correction length during a fixed number of straightening operations, preferably between 10 and 50, is continuously stored, the correction length for the subsequent straightening operation being determined as the average value of the stored correction lengths. In this way it is avoided that single defective objects disturb the correction of the subsequent object.

For the embodiment described in connection with FIG. 3 the total regulating range can typically amount to e.g. ±1.25 mm with a degree of accuracy of ±0.01 mm. The maximum velocity of the motion of the straightening block til it contacts the object can typically amount to 1 mm/sec and the velocity during the shape correcting pressing itself to e.g. 0.5 mm/sec.

To the microcomputer 8 also a step motor 26 is connected which is disposed to rotate the object 2 while sensing its shape. After determination of the maximum deviation in the shape the step motor 26 is controlled by the microcomputer 8 so that the object 2 is turned to that position in which the measurement transmitter 4 indicates maximum deviation in the shape.

The object 2 is then transmitted to the straightening device with the orientation maintained so that the straightening block 12 engages the object in the right place for obtaining the desired correction of the shape.

Figure 5:
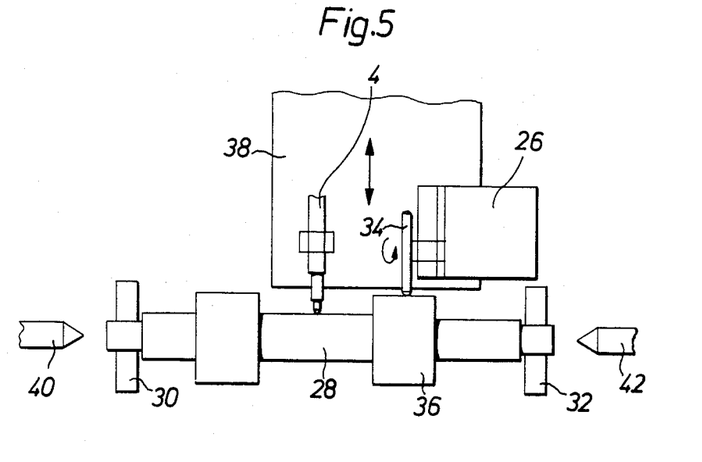

FIG. 5 illustrates more in detail the sensing of the shape of a rotational symmetric object in the form of a shaft 28. The shaft 28 is rotatably disposed on supports 30, 32 and is rotated during the sensing of its shape by the step motor 26 by means of a driving wheel 34 abutting on a portion 36 of said shaft 28. The step motor 26 and the measurement transmitter 4 are mounted on means 38, such as a roll slide, which is vertically adjustable in relation to the shaft 28. After carrying out the measurement step itself, i.e. after the determination of the maximum deviation and rotation of the shaft to a position in which the measurement transmitter 4 indicates maximum deviation in the shape, said movable means 38 with the step motor 26 and the measurement transmitter 4 are removed from the shaft. Alternatively, instead of the above-mentioned supports 30,32 (V-supports) pneumatically driven dowel pins 40,42 are provided to engage the ends of the shaft 28 to hold it in a rotatable way.

Figure 6:
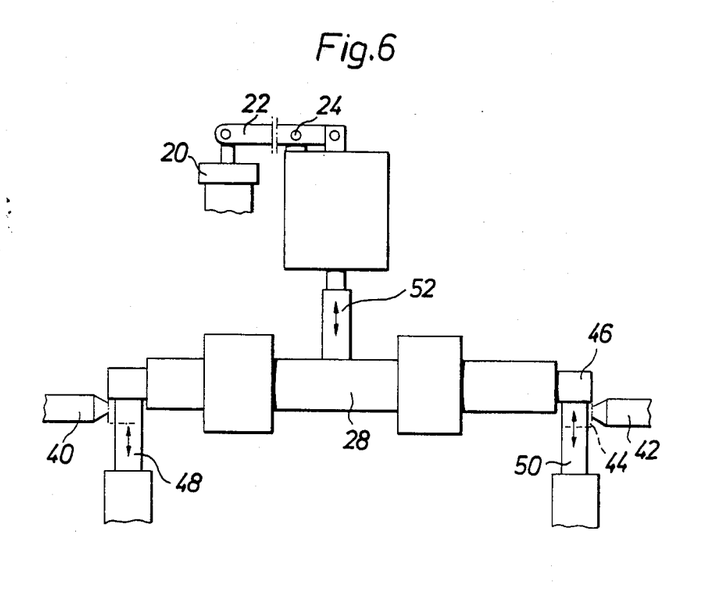

After performing the above-mentioned measurement step the shaft 28 is moved from the measuring position 44 to a straightening position 46, see FIG. 6. This is doen by hydraulicly adjustable V-supports 48,50. The shape correction or straightening of the shaft 28 is performed with a straightening member 52, the motion of which is produced by the hydraulic cylinder 20. The straightening member 52 is then pressed towards the shaft 28 with a constant, sufficiently large force over a distance corresponding to the computed correction lengths. The supports 48, 50 can be movable in the longitudinal direction of the shaft 28, said movement being controlled from the microcomputer 8 so that the supports take the optimum positions for the shape correction in question.

Figure 7:
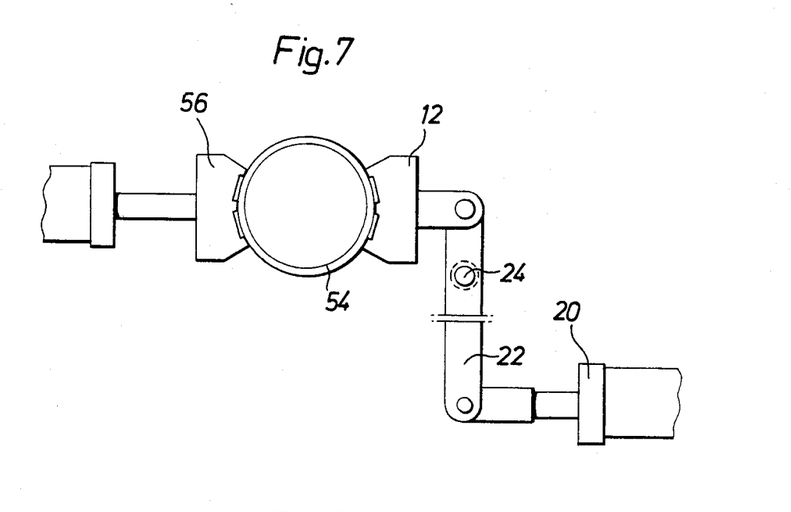
FIG. 7 shows an example of engagement blocks for straightening e.g. rings.

FIG. 7 shows an alternative embodiment of the straightening apparatus, particularly adapted for correction of ovalities of rings, cylinders, and the like. This straightening apparatus comprises in addition to the straightening block 12 operated from the servocontrolled hydraulic cylinder 20 an opposite also hydraulicly driven engagement block 56. The ring or cylinder 54 to be straightened is positioned between the blocks 12 and 56 after rotation of the ring or cylinder by the step motor 26 in the way described above so that the ends of the oval cylinder or ring are situated just in front of the blocks. The straightening is performed by moving the servocontrolled straightening block 12 a distance corresponding to the correction length as described above.

Figure 8:
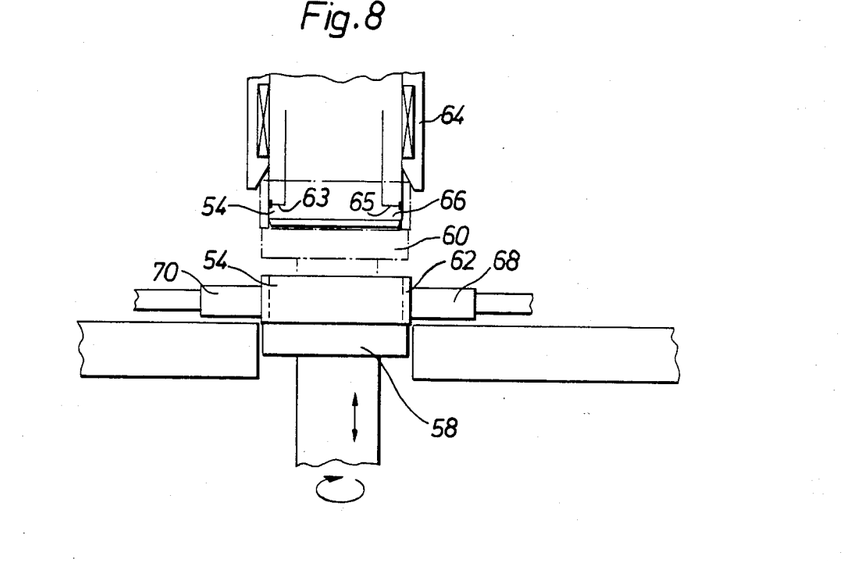
FIG. 8 is an example of how the measurement-and straightening positions preferably are arranged in relation to each other in an embodiment of the apparatus according to the invention which is intended for correction of the shape of rings.

FIG. 8 illustrates how the measuring step and the shape correction step in practice are carried out in two different places or stations for the ring or the cylinder 54. The ring or the cylinder 54 rests on a rotatable support 58 driven by the step motor 26. The support 58 is further movable in vertical direction in FIG. 8 between an upper measuring position 60 and a lower straightening position 62. With the ring or the cylinder 54 in the upper measuring position 60 the sensing or measuring of the shape of the cylinder or the ring 54 is carried out as described above. The measurement transmitter comprises a measuring head 66 disposed in a rotating centering device 64. In the example shown in the figure the inner shape of the ring or the cylinder 54 is then sensed by two measuring points 63 and 65. The measuring head can, of course, alternatively be formed to sense the outer shape.

After termination of the measurement and the determination of the maximum deviation in the shape, the ring or cylinder 54 is lowered to the straightening position 62, said ring or cylinder 54 being turned by the rotatable support 58 to such a position that the oppositely positioned straightening blocks 68, 70 engages the ring or cylinder 54 in the regions of maximum ovality (along the major axis of the oval) upon moving the blocks 68, 70 towards each other. For the shape correcting staightening of the ring or cylinder 54 at least one of the straightening blocks 68, 70 is moved a distance corresponding to the correction length computed for the shape deviation in question, in a manner described above.

The adaptive straigthening method according to the present invention can also be used for determining the exact relationship between correction length and deviation in the shape. A number of objects having different deviations in the shape is then selected and the correction of the shape is started from a rough estimate of the relationship correction length-deviation in the shape. By the adaptive method this roughly estimated relationship will be progressively directed towards the exact relationship between correction length and deviation in the shape for different shape deviations.

The invention can preferably comprise several repeated shape correction steps. After a first shape correction with the correction length determined from the graph a in FIG. 2, the object can be brought back to the measuring station for a repeated sensing of the shape of the object. If the desired shape has not been obtained the whole shape correction method can be repeated, the correction length then being determined by a graph b in FIG. 2. The graph b is situated above the graph a, since a certain cold working of the object takes place in the first straightening operation. In principle this shape correction process can be repeated arbitrarily many times until the desired correction has been obtained. In practice economic considerations will probably put an upper limit for the number of repeated shape correction processes. After the last shape correction the shape of the object is sensed to decide whether the object can be accepted or must be rejected. In the same way as described above the correction graphs a, b, c, can be adaptively corrected when necessary also in the multi-step method.

The described examples of the apparatus according to the invention are intended for correction of form defects to acceptable form tolerances e.g. in the range 0.01–0.05 mm for products having external dimensions for the diameter for example about 200 mm and for the length for example about 700 mm.

Obviously a plurality of modifications of the described examples are possible within the field of the invention. Thus several axially separated measurement transmitters can, of course, be used for sensing the form of for example a shaft, and more than two straightening members can, of course, be used. Instead of hydraulicly driven straightening members, straightening members driven in a purely mechanical way, for example by screw threads, can be used.

The invention can also be used for applications other than those described in connection with the descriptions of the above examples. Thus, the invention can be used for correction of the shape of bodies which are not rotational symmetric. The invention can be used to mould a sheet to a desired, exactly defined shape, for example to a plane shape within given tolerances. The invention can also be used for forming e.g. rings to a desired ovality within carefully given tolerances, etcetera.

I claim:

1. An adpative method for correcting deviations from the desired shape of a plastically deformable object, said method comprising the successive steps of
    (a) sensing the real shape of the object;
    (b) determining the maximum deviation of the real shape from the desired shape, said desired shape being a circular shape and said deviation in the shape being an ovality of the object;
    (c) defining a correction length corresponding to said deviation, the size of said correction length being determined by a given relationship between correction length and deviation;
    (d) subjecting the object in a straightening operation to a shape correction corresponding to the defined correction length by applying two oppositely directed compressive forces on the object along the longitudinal axis of the oval shape to force regions of maximum deviations toward desired shape a distance corresponding to the correction length;
    (e) sensing the shape of the object after said straightening operation;
    (f) determining any possibly remaining deviation from desired shape;
    (g) forming the difference between the deviation in the shape before and after said straightening operation;
    (h) and changing said relationship between correction length and deviation by multiplication of the correction length by a factor reciprocally proportional to said difference.

2. The method according to claim 1, comprising the steps of forming an average value of the correction lengths in a number of the closest preceding straightening operations and using said average value as the correction length for the straightening operation in question.

3. The method according to claims 1 or 2, wherein a second correction length is determined which corresponds to a possible deviation in the shape remaining after the first correction of the shape, and the object in a second straightening operation is subjected to a correction of the shape corresponding to said second correction length.

4. The method according to claims 1 or 2, wherein after the last shape correction operation the shape of the object is sensed and compared with the desired shape for acceptance or rejection of the object.

5. The method according to claim 1, wherein said forces are constant.

6. An apparatus for correcting deviation of a plastically deformable object from a desired shape, said apparatus comprising;
    (A) at least one measurement transmitter for sensing the real shape of an object and delivering a corresponding output signal;
    (B) a data processing unit connected to said measurement transmitter for receiving said output signal;
    (C) a memory connected to said data processing unit and adapted to store a predetermined relationship between deviation in the shape and correction length, said data processing unit being adapted to store information about the desired shape of the object for comparison of the sensed shape of the object represented by said output signal from said measurement transmitter with the desired shape of the object for determining the deviation in the shape, and from said relationship stored in said memory determining the size of the correction length corresponding to said determined deviation of the shape, and delivering a corresponding output signal;
    (D) and a straightening device connected to said data processing unit for receiving said output signal therefrom and comprising at least one straightening member to carry out a corrective forming of the object determined by said correction length, said straightening member comprising a hydraulicly driven straightening shoe arranged between two supports opposite to said shoe and separated in the longitudinal direction of the object, said supports being displaceable in the longitudinal direction of the object and said displacement of said supports being controllable from said data processing unit to positions of said supports along the longitudinal direction of the object which are optimal for the shape correction in question; said measurement transmitter being arranged to sense the real shape of the object after the straightening operation and deliver to said data processing unit a second output signal for determining possibly remaining deviation in the shape of the object after the straightening operation, said data processing unit being arranged to then form the difference between the deviation in the shape before and after said straightening operation and change said predetermined relationship stored in said memory by multiplication of the actual correction length by a factor reciprocally proportional to said difference.

7. The apparatus according to claim 6, further comprising a position servo unit controlled by said data processing unit and disposed to control the movement of said straightening member of said straightening device.

8. The apparatus according to claims 6 or 7, said object being rotationally symmetric, further comprising means to rotate the object while said measurement transmitter senses the shape, said data processing unit being disposed to determine the largest deviation from desired shape.

9. The apparatus according to claim 8, wherein further means are provided to rotate the object in such a position in relation to said straightening member that said straightening member engages the object in such a way that at first hand said largest deviation in the shape is corrected.

10. The apparatus according to claims 6 or 7, wherein said straightening member comprises two hydraulicly driven oppositely positioned, straightening blocks to correct ovalities of circular objects, said blocks working toward each other to apply compressive forces on an object positioned between said blocks in such a way that said forces are applied along the longitudinal axis of the oval shape.

* * * * *